United States Patent
Frederiksen

(10) Patent No.: US 8,935,822 B2
(45) Date of Patent: Jan. 20, 2015

(54) MODULAR RAMP CONSTRUCTION AND WEDGE ELEMENTS HEREFORE

(71) Applicant: Excellent Holding ApS, Morke (DK)

(72) Inventor: Ole Frederiksen, Hornslet (DK)

(73) Assignee: Excellent Holding ApS, Morke (DK)

( * ) Notice: Subject to any disclaimer, the term of this patent is extended or adjusted under 35 U.S.C. 154(b) by 0 days.

(21) Appl. No.: 14/087,599

(22) Filed: Nov. 22, 2013

(65) Prior Publication Data

US 2014/0143961 A1    May 29, 2014

(30) Foreign Application Priority Data

Nov. 23, 2012 (DK) .................................. 2012 70726

(51) Int. Cl.
| | | |
|---|---|---|
| *E01D 1/00* | (2006.01) | |
| *E01D 19/06* | (2006.01) | |
| *B65G 69/30* | (2006.01) | |
| *B66F 7/24* | (2006.01) | |
| *E04F 11/00* | (2006.01) | |

(52) U.S. Cl.
CPC ............... *E01D 19/06* (2013.01); *B65G 69/30* (2013.01); *B66F 7/243* (2013.01); *E04F 2011/007* (2013.01); *E04F 11/002* (2013.01)
USPC .......................................................... 14/69.5

(58) Field of Classification Search
CPC ......... B66F 7/243; B65G 69/30; E01D 19/06; E04F 11/002; E04F 2011/007
USPC ............................................ 14/36.5; 254/88
See application file for complete search history.

(56) References Cited

U.S. PATENT DOCUMENTS

| | | | | |
|---|---|---|---|---|
| 4,165,862 A | * | 8/1979 | Bennett ........................... | 254/88 |
| 4,427,179 A | * | 1/1984 | Price ............................... | 251/88 |
| 4,819,910 A | * | 4/1989 | Johnston ......................... | 254/88 |
| D347,502 S | * | 5/1994 | Mazza ............................ | D34/32 |
| 5,328,154 A | * | 7/1994 | Blatz et al. ...................... | 257/88 |
| 6,517,051 B1 | | 2/2003 | Cavanaugh | |
| 6,718,588 B1 | * | 4/2004 | Frederiksen ................... | 14/69.5 |
| 6,752,381 B2 | * | 6/2004 | Colak et al. ..................... | 254/88 |
| 6,993,801 B2 | * | 2/2006 | Marko et al. ................... | 14/69.5 |

(Continued)

FOREIGN PATENT DOCUMENTS

| | | |
|---|---|---|
| DE | 20220026 | 2/2004 |
| EP | 0622281 | 11/1994 |

OTHER PUBLICATIONS

Danish Patent and Trademark Office, Search Report for Patent Application No. PA201270726, Jun. 14, 2013.

*Primary Examiner* — Raymond W Addie
(74) *Attorney, Agent, or Firm* — Ice Miller LLP

(57) ABSTRACT

The present invention relates to a modular ramp constructions that facilitate the passage of objects over obstacles on a surface such as a doorstep or a flight of stairs. Specifically the present invention relates to a construction that facilitates the passage of a wheelchair or other appliances used by physically handicapped persons over such obstacles. The construction comprises wedge elements (1) that can be adapted to the given dimensions and requirements of a ramp construction, to which purpose the length of the wedge elements (1) can easily be shortened and where the wedge elements (1) are provided with means (6) for releasable attachment to adjacent tile elements (8) of the modular ramp construction, thereby making it possible quite easily to assemble and afterwards dismantle the construction when it is to be adapted to another application.

3 Claims, 4 Drawing Sheets

(56) References Cited

U.S. PATENT DOCUMENTS

| | | | |
|---|---|---|---|
| 7,073,777 B2 * | 7/2006 | Branstetter | 254/88 |
| 7,104,524 B1 * | 9/2006 | Hidding et al. | 254/88 |
| D550,922 S * | 9/2007 | Bain | D34/32 |
| D551,152 S * | 9/2007 | Funk et al. | D12/217 |
| 7,621,504 B2 * | 11/2009 | McCallum | 254/88 |
| 7,980,532 B2 * | 7/2011 | Wickwire | 254/88 |
| 2002/0124332 A1 | 9/2002 | Janowak | |

\* cited by examiner

MODULAR RAMP CONSTRUCTION AND WEDGE ELEMENTS HEREFORE

TECHNICAL FIELD

The present invention relates generally to constructions that facilitate the passage of objects over obstacles on a surface such as a doorstep or a flight of stairs. More specifically the present invention relates to a construction that facilitates the passage of a wheelchair, pallet truck, forklift, small vehicle or other appliances over such obstacles as thresholds, doorsteps, differences in height between two floor surfaces, steps etc. Still more specifically, the invention relates to modular constructions for such applications and to modules used in such constructions.

BACKGROUND OF THE INVENTION

A ramp construction for the above purposes has been described in applicant's International Patent Application WO 0/02667, which is hereby incorporated by reference. This modular construction comprises basically two kinds of elements, ramp elements with a flat bottom surface and an upper surface, at least a portion of which is inclined at an angle relative to the bottom surface, and tile elements of a generally box-shaped geometry which can be placed underneath said ramp elements to form a composite modular ramp construction. Modules are attached to adjacent modules by means of dowel elements that are passed through holes in a given element and into mating holes in an adjacent element underneath the given element. When adjacent elements are attached to each other in this manner it is however very difficult at remove said dowel elements again in order to release adjacent elements from each other.

As the height (thickness) of the modules described in WO 0/02667 is fixed, difficulties may arise when a ramp construction as described in this document has to be adapted to the height of a given obstacle on a floor, such as a doorstep. Consequently, a vertical level difference between the highest level of the ramp construction and the height of for instance a doorstep may exist, which level difference could make it difficult, or at least uncomfortable, for a person sitting in a wheelchair to pass over the doorstep. This is only one situation, where such level differences will prove problematic. Another situation would be when a heavy object should pass a doorstep or other obstacle on a floor or ground portion carried on a cart or trolley.

A further wedge system is known from EP 0 622 281. This system comprises two cooperating wedge parts which are to be assembled in order to provide the desired wedge. Each wedge part is provided with means in the shape of recesses in upper surface of the lower part and matching protrusions in the lower surface of the upper part, such that the two parts may be superposed and the means engage. Furthermore to maintain the wedge parts in their desired position relative to each other a bolt or the like is used to fastend the two parts to each other.

Basically this construction is very complicated. In order to provide a wedge the parts must be assembled correctly, and adjusted to the desired angle. Furthermore in addition to the number of parts involved the assembly also requires working time and thereby an extra expense.

OBJECT OF THE INVENTION

On the above background it is an object of the present invention to provide a modular ramp construction and elements for this that makes it possible easily to adapt a modular ramp construction, as for instance such constructions described in WO 0/02667, to different heights of obstacles, such as doorsteps, and thereby elimination or at least reducing problems associated with the passage over abrupt level differences between the upper surface of the ramp construction and an adjacent obstacle.

SUMMARY OF THE INVENTION

The above and further objects and advantages are according to the invention obtained by the provision of wedge elements, the height and lengths of which can easily be changed, preferably—although not necessarily—without the use of tools, which wedge elements can be placed underneath a modular ramp construction as for instance described in the above mentioned document WO 0/02667.

Furthermore, it is advantageous to provide wedge elements that can easily be attached underneath the modular ramp construction and removed from the ramp construction, when such elements are no longer needed. This advantageous effect is provided by the wedge elements according to the invention by the provision of releasable attachment means on the top surface of the wedge element, which attachment means fit into mating means provided on the bottom surface of an adjacent portion of an element located above the wedge element.

A wedge element according to the invention basically comprises a bottom surface and a top surface inclining an angle $\alpha$ relative to the bottom surface, where the wedge element along opposing edge portions is provided with tap members outwardly extending from the top surface of the wedge element, whereby the wedge element can be releasably attached to receptor means provided on the bottom surface of an adjacent element of a modular ramp construction.

The wedge elements according to the invention are according to an embodiment of the invention composed of a plurality of transversally extending sections, which make it possible to adapt the total length and height of a specific wedge element to specific needs in a given modular ramp construction. Adjacent sections are preferably, although not necessarily, interconnected by means that allows sections to be separated from each other easily without the use of tools.

Examples of possible ramp, tile and wedge element combinations that can be assembled to form a ramp construction according to various embodiments of the present invention will be given in the detailed description of the invention.

BRIEF DESCRIPTION OF THE DRAWINGS

The invention will be better understood by reference to the following detailed description of some embodiments of the invention in conjunction with the figures, where:

FIG. 2(*b*) shows a detailed view illustration the engagement of a wedge element according to an embodiment of the invention with an overlying tile element;

DETAILED DESCRIPTION OF THE INVENTION

Figure 1:
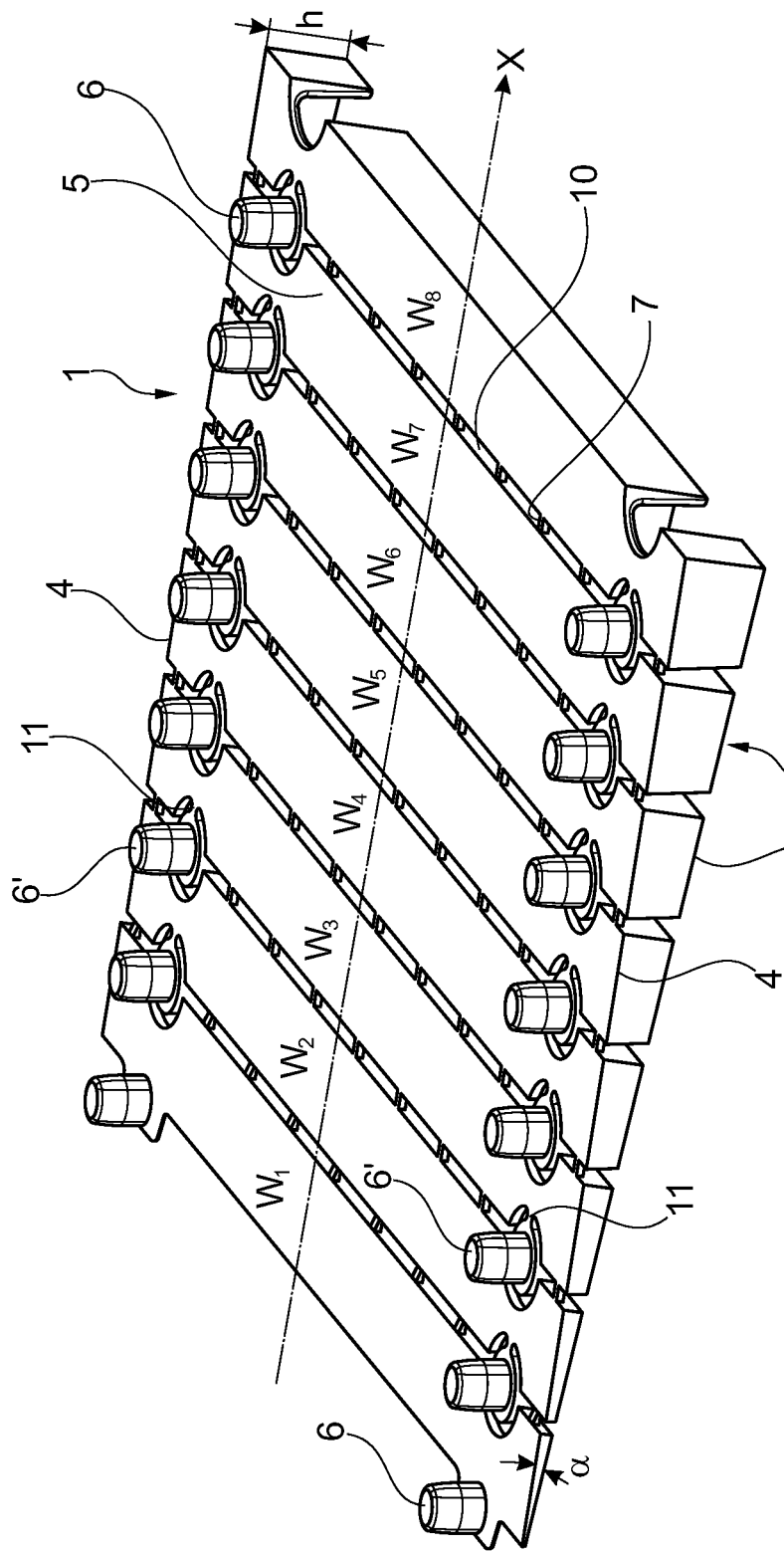
FIG. 1 shows an embodiment of a wedge element according to the invention.

With reference to FIG. 1 there is shown an embodiment of a wedge element according to the invention generally designated by reference numeral 1. The wedge element comprises a top surface 5 and a bottom surface or portion 2, which is not visible in the figure, but which bottom surface or portion is bounded by edge portions 3. The top surface 5 of the wedge element inclines an angle α relative to the bottom surface. The axis X shown in the figure indicated the longitudinal extension of the wedge. The top surface 5 is bounded by edge portions 4.

Adjacent either edge portion 4 of the top surface 5 there is provided outwardly extending tap members 6 by means of which the wedge element 1 can be releasably attached to an adjacent surface of the modular ramp construction. Said adjacent surface can be a surface of a tile element, in which the bottom and top surfaces extend substantially in parallel with each other or a combination of a surface portion of two adjacent tile elements. Examples of such possible combinations of wedge and tile elements will be described in the following.

The wedge element 1 according to the embodiment of the invention shown in FIG. 1 comprises a plurality of wedge sections $w_1, w_2, \ldots, w_N$ (in the shown example a total of eight such sections), where adjacent wedge sections are separated by a narrow slit 10 bridged by a number of bridge members 7. The provision of a slit and bridge members between adjacent wedge elements facilitates separation of adjacent segments during adaptation of a ramp construction. It is understood that also alternative means separations between two adjacent segments could be used and would fall within the scope of the present invention. It would even be possible to omit slits/bridge members altogether from the wedge element and to separate it by means of an appropriate tool. In the embodiment of a wedge element according to the invention shown in FIG. 1 the tap members 6 are connected to the corresponding section of the wedge member by a bridge member 11 connecting a base portion of the tap member (e.g. 6') with the corresponding wedge section (e.g. $w_3$).

Figure 2A:
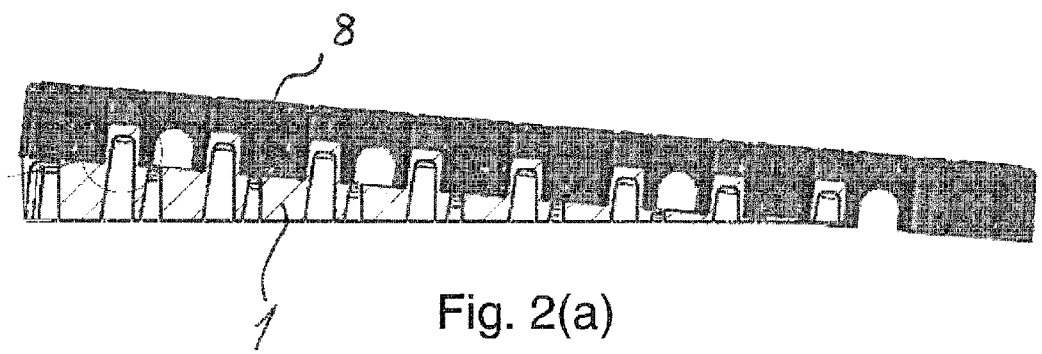
FIG. 2(*a*) shows a schematic cross sectional view of a wedge element according to an embodiment of the invention placed underneath and in engagement with a tile element.

FIG. 2(a) shows a schematic cross sectional view of a wedge element 1 according to an embodiment of the invention placed underneath and in engagement with a tile element 8, such as those described in WO 0/02667.

Figure 2B:
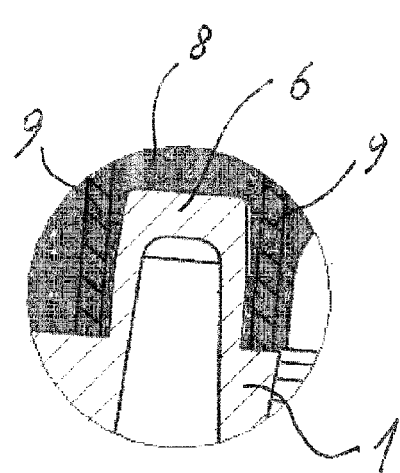

FIG. 2(b) shows a detailed illustration the engagement of a wedge element 1 according to an embodiment of the invention with an overlying tile element 8. Releasable engagement between the wedge element 1 and the tile element 8 is provided by the tap element 6 fitting into the interior region of tubular members 9 that are provided in the bottom portion of the tile element 8.

Figure 3:
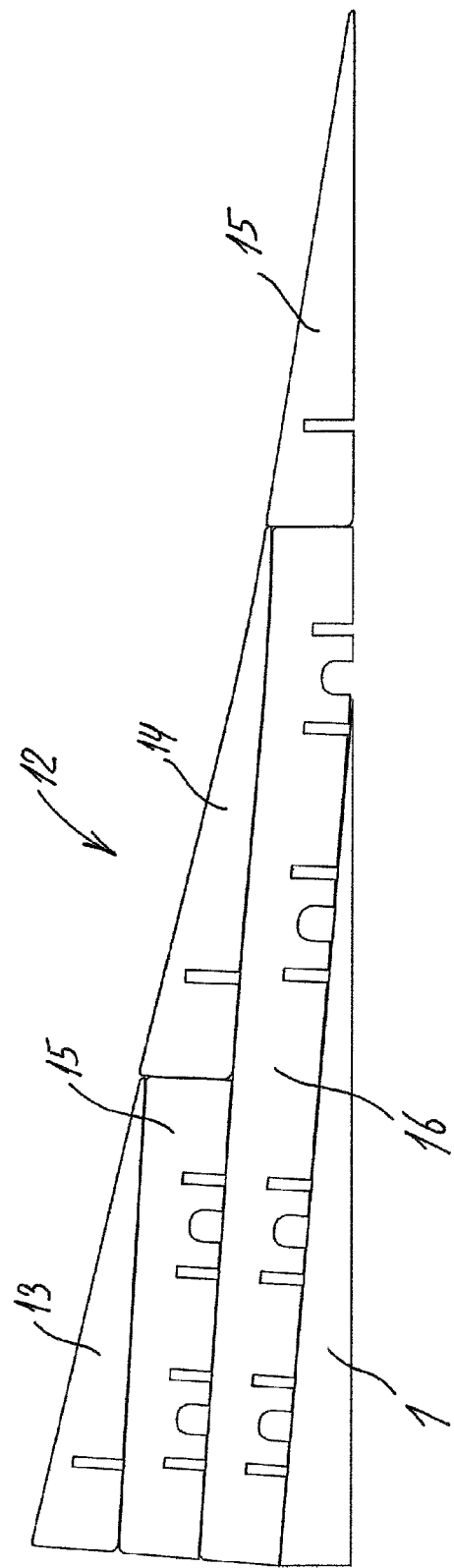
FIG. 3 shows a schematic cross sectional view of a ramp construction according to a first embodiment of the invention.

Referring to FIG. 3 there is shown a schematic cross sectional view of a ramp construction according to a first embodiment of the invention generally designated by reference numeral 12. The ramp construction shown in FIG. 3 comprises ramp elements 13, 14, 15 and a wedge element 1. The construction furthermore comprises a two tile elements 15, 16 of substantially rectangular cross section, one of which (indicated by reference numeral 16) is resting on the wedge element 1 and releasably attached to this by means of the tap members 6 extending from the top surface of the wedge element and the corresponding tubular members 9 of the tile element 16. By use of the wedge member in the manner shown in FIG. 3, the maximum height of the modular ramp construction is adapted to the height of an adjacent doorstep (not shown in the figure).

Figure 4:
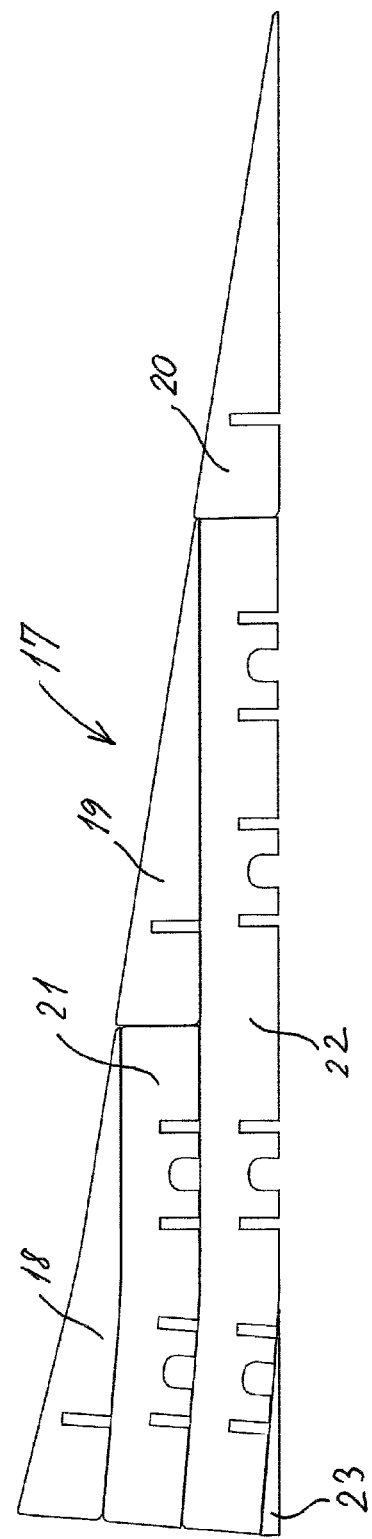
FIG. 4 shows a schematic cross sectional view of a ramp construction according to a second embodiment of the invention.

With reference to FIG. 4 there is shown a schematic cross sectional view of a ramp construction corresponding to the one shown in FIG. 3, but wherein the maximum height of the ramp construction is less than that of FIG. 3. This reduced height of the ramp construction is according to the invention obtained by applying a shorter and lower wedge element 23 underneath the tile element 22. The wedge element 23 can be obtained for instance using a wedge element comprising a number of sections as described above and shortening the wedge element appropriately before placement underneath the tile element 22. The modular ramp construction shown in FIG. 4 comprises ramp elements 18, 19, 20, tile elements 21, 22 and the wedge element 23.

The invention claimed is:

1. A modular ramp construction for bridging two substrate surfaces at different elevations, the modular ramp construction comprising;
    a plurality of generally rectangular tile elements;
    a plurality of wedge elements having a bottom surface and a top surface extending at an angle α relative to the bottom surface; wherein at least some of the wedge elements further comprise tap members disposed along opposing edge portions of said top surface, whereby said at least some wedge elements can be releasably attached to an adjacent tile element, thereby positioning the adjacent tile element at an angle relative to a lower of said two substrate surfaces; wherein said wedge elements are subdivided into sections, such that the wedge elements can be shortened in the direction of inclination of said top surface, whereby the wedge elements can be adapted to form ramp assemblies of varying sizes and shapes.

2. The modular ramp construction according to claim 1 wherein adjacent sections of said wedge are separated from each other by a narrow slit bridged by bridging members connecting adjacent sections to each other.

3. The modular ramp construction according to claim 1 wherein said tap members on said at least some of said wedge elements extend substantially perpendicularly relative to said top surface of said wedge element and wherein said tap members are substantially tubular.

* * * * *